United States Patent [19]

Rist

[11] 3,801,354

[45] Apr. 2, 1974

[54] PROCESS FOR ADHERING ACRYLICS TO CHROME

[75] Inventor: George A. Rist, Wilmington, Del.

[73] Assignee: E. I. du Pont de Nemours and Company, Wilmington, Del.

[22] Filed: Apr. 7, 1972

[21] Appl. No.: 242,193

[52] U.S. Cl............. 117/75, 117/71 M, 117/132 C
[51] Int. Cl.......................... B32b 15/08, B44d 1/14
[58] Field of Search. 117/75, 132 C, 71 M, 161 UT, 117/161 UC

[56] References Cited
UNITED STATES PATENTS

| | | | |
|---|---|---|---|
| 2,956,902 | 10/1960 | Greif | 117/75 |
| 3,113,845 | 12/1963 | Uchida et al. | 117/75 X |
| 3,137,666 | 6/1964 | Lox et al. | 117/132 C X |
| 3,060,148 | 10/1962 | Evans et al. | 117/75 X |
| 3,069,291 | 12/1962 | Levine et al. | 117/75 |

Primary Examiner—Ralph Husack

[57] ABSTRACT

There is provided a process for adhering acrylic finishes to chrome wherein prior to application of the acrylic finish this chrome surface is treated with a primer comprising a vinyl chloride, vinyl acetate, dibasic acid interpolymer and the acrylic finish and primer are cured simultaneously at a temperature of at least 235°F.

20 Claims, No Drawings

PROCESS FOR ADHERING ACRYLICS TO CHROME

This invention is a process for adhering acrylic finishes to chrome surfaces and the acrylic coated chrome product so prepared.

This invention is a process for applying an acrylic coating to a chrome surface by applying a film-forming composition comprising acrylic polymer of film-forming molecular weight to a chrome surface and causing film formation thereon by the application of heat, wherein prior to application of the acrylic polymer to the chrome surface there is applied a primer composition comprising an interpolymer of vinyl chloride, vinyl acetate and a dibasic acid, said interpolymer containing at least 80% by weight of monomeric units derived from vinyl chloride, at least 10% by weight of monomeric units derived from vinyl acetate and at least 0.3% by weight but not more than 5% by weight of monomeric units derived from a dibasic acid or anhydride thereof, and application of heat is at a temperature of at least 235°F.

Preferably the acrylic is applied as a spray. However, the acrylic polymer can be applied by a contact applicator. The primer composition is also preferably applied as a spray.

The interpolymer preferably consists essentially of between 83 and 88% by weight of monomeric units derived from vinyl chloride, between 10 and 15% by weight of monomeric units derived from vinyl acetate and not more than 2% by weight of monomeric units derived from a dicarboxylic acid or anhydride thereof, and most preferably the interpolymer consists essentially of about 86% by weight of monomeric units derived from vinyl chloride, about 13% by weight of monomeric units derived from vinyl acetate and about 1% by weight of monomeric units derived from maleic acid or maleic anhydride.

Typically, the primer composition also contains an organotin maleate in an amount of between 3 and 8% by weight based on the weight of the interpolymer and the primer composition containing interpolymer and stabilizer comprises at least 90% by weight of methylethyl ketone or similar solvent. Other suitable solvents include methylisobutyl ketone, cyclohexanone, butyl acetate, isobutyl acetate.

In curing the acrylic coating and primer the surface is heated to a temperature of at least 235°F., preferably 275°F. and most preferably at least 300°F.

By "chrome" is meant an alloy of chromium. Chrome plated material therefore is material plated with an alloy of chromium.

By "acrylic coating" is meant a finish composition containing film-forming acrylic polymer, methacrylic polymer, copolymers thereof of mixtures of any of the above. Copolymer as used herein means polymer with two or more monomeric units.

These polymers include those with copolymerized acid function and adhesion promoting monomeric units and the like. Such polymers preferably have a molecular weight of at least 50,000 and most preferably at least 80,000. Most typically such polymers have a molecular weight of between 80,000 and 100,000. These polymers are typically provided in a vehicle which is a solvent therefor or dispersant therefor which will volatilize on application of the acrylic polymer. Typical of such a polymer is an acrylic polymer which contains about 20-95% by weight of units of an alkyl methacrylic ester or an alkyl acrylate ester or a mixture of these esters. The alkyl group of the aforementioned esters contains from one to eight carbon atoms and is usually derived from a lower alkyl monohydric. Typical esters used for the acrylic polymer are methyl methacrylate, ethyl methacrylate, propyl methacrylate, isopropyl methacrylate, butyl methacrylate, octyl methacrylate, ethyl acrylate, propyl acrylate, isopropyl acrylate, butyl acrylate, isobutyl acrylate, hexyl acrylate, 2-ethylhexyl acrylate and the like. Up to about 50% by weight of the acrylic polymer can consist of styrene which is substituted for a portion of the alkyl methacrylate or alkyl acrylate ester.

The acrylic polymer may contain 5–20% by weight of a hydroxy containing compound. Typical useful hydroxyl containing units are hydroxyalkyl acrylates or hydroxyalkyl methacrylates in which the alkyl group contains one to eight carbon atoms; for example, derived from hydroxyethyl acrylate, hydroxypropyl acrylate, hydroxybutyl acrylate, hydroxyhexyl acrylate, hydroxyoctyl acrylate and the like, hydroxymethyl methacrylate, hydroxyethyl methacrylate, hydroxypropyl methacrylate, hydroxybutyl methacrylate, hydroxyhexyl methacrylate, hydroxyoctyl methacrylate and the like.

The acrylic polymer may contain about 0–6% by weight of an $\alpha\beta$-ethylenically unsaturated monocarboxylic acid. Typically useful $\alpha,\beta$-ethylenically unsaturated monocarboxylic acids used to prepare the acrylic polymer are acrylic acid, methacrylic acid, crotonic acid, itaconic acid and the like. Preferred are acrylic acid and methacrylic acid since these acids form a high quality polymer.

A preferred acrylic polymer is a terpolymer of methyl methacrylate, an alkyl acrylate in which the alkyl group has two to four carbon atoms, a hydroxyalkyl acrylate or methacrylate in which the alkyl group has one to four carbon atoms and an $\alpha,\beta$-unsaturated monocarboxylic acid which is either acrylic acid or methacrylic acid. Typical spray formulations include:

| Acrylic Resin 10–40% by wt. | Pigment up to 25% | Plasticizer up to 15% | Solvent 50–90% by wt. |
|---|---|---|---|

Typical roller or finish formulations include:

| Acrylic Resin 25-65% by wt. | Pigment up to 25% | Plasticizer up to 15% | Solvent 35-65% by wt. |
|---|---|---|---|

Any pigment is suitable and any typical plasticizers known for acrylic resins, such as benzyl butyl phthalate, dicyclohexyl phthalate and diisodecyl phthalate.

An embodiment of the interpolymer is available from Union Carbide and is designated VMCH with a molecular weight about 45,000. A polymer in a range of molecular weights between 30,000 to 80,000 should be suitable. VMCH is believed to contain 86% by weight monomeric units derived from vinyl chloride, 13% monomeric units by weight derived from vinyl acetate and about 1% by weight of monomeric units derived from maleic acid. This may be formulated with a stabilizer such as an organotin maleate to give the VMCH extended shelf stability. Typical of such organotin maleate is "Thermolite" 13 available from M&T Chemical Co. — Rahway, N.J.

Alternate — Ferro Corp. — Bedford, O.

The interpolymer may be formulated in solvent such as methylethyl ketone and additional adhesion promoting materials include "Silane" A-187 (gamma-glycidoxypropyltrimethoxysilane) may be included in small amounts typically such as 30% or less based on weight of VMCH in the interpolymer formulation.

In typical application the primer may be applied as a mist coat or by light contact application with the chrome surface. Excess primer is economically undesirable and does not assist adhesion. It need not be cured before application of the acrylic coating. Curing after application of the acrylic coating by application of heat for a sufficient time at a temperature of at least 235°F. should suffice. Temperatures above 275°F. and preferably at about 300°-350°F. are preferred. Time of curing will vary depending on the acrylic coating composition which may also contain plasticizer, filler, pigment and the like.

In the Example which follows all parts are by weight unless otherwise indicated.

EXAMPLE I

Chrome plate strips were sprayed with a black lacquer consisting essentially of a composition having about
   6.6% anhydrous ethyl alcohol
   7.6% toluene
   10.0% ethylene glycol monoethylether acetate
   7.6% film-forming polymer of a methyl methacrylate copolymerized with 1% by weight of amine adhesion promoting units (DEAM) — diethylaminoethyl methacrylate
   6.4% of dispersion having by weight 48% of acrylic resin which is predominantly the film-forming acrylic polymer above
   8.5% carbon black
   0.4% wetting agent
   43.1% CAB (cellulose acetate butyrate)
   60.6% of a dispersion having by weight
   47.8% by weight of acrylic resin which is predominantly copolymer and terpolymer having units of methyl methacrylate and DEAM
   25.8% toluene
   7.6% anhydrous isopropyl alcohol
   1.5% polybutyl acrylate
   5.8% acetone
   5.5% CAB (cellulose acetate butyrate) after applying a light mist coating of a composition consisting essentially of
   94.2% methylethyl ketone
   4.0% VMCH
   1.6% of gamma-glycidoxypropyltrimethoxysilane and
   0.2% of "Thermolite" 13 which is an organotin maleate after a 10-minute flash at ambient conditions the strips were baked for 30 minutes at the temperature indicated in the test.

Two sets of samples were prepared — those in which the acrylic finish was applied immediately after application of the primer (i.e., 10 minutes — samples A–E) and those in which acrylic finish was applied one week later (samples F–I). In each case curing occurred only after application of acrylic finish. Ratings were made for the first set at room temperature immediately after cure and 1 day after cure. Ratings were made for the second set at 1 day after cure.

Ratings were the result of a scotch tape adhesion test which is performed substantially as follows — an X is scratched through a finish applied to a surface. The X is about one-half inch wide at the open end of the X. It is about 1 inch long. Scotch tape about 1 inch wide and long enough to cover the X and provide a tab (say about 2 inches) is pressed over the X. The tab is pulled to remove the tape and the appearance of the X is evaluated as set forth in the footnote to Table I.

Results are tabulated in Table I.

TABLE I

TAPE ADHESION TEST* ON CHROME

| Sample | 30 min. Cure | Rating at Room Temperature (Immediately after Cure) | | Rating at Room Temperature (24 Hours after Cure) | |
|---|---|---|---|---|---|
| | | Control (Acrylic only) | Acrylic & Primer | Control (Acrylic only) | Acrylic & Primer |
| A | 200°F. | 7 | 7 | 4 | 4 |
| B | 225°F. | 2 | 7 | 2 | 5 |
| C | 250°F. | 7 | 9 | 7 | 7 |
| D | 275°F. | 7 | 9 | 7 | 9 |
| E | 300°F. | 7 | 10 | 7 | 10 |
| F | 200°F. | — | — | 4 | 4 |
| G | 250°F. | — | — | 7 | 7 |
| H | 275°F. | — | — | 7 | 10 |
| I | 300°F. | — | — | 7 | 10 |

*Rating >7 - Unsatisfactory
7 - Jagged peeling along lines to ⅛"
8 - Smooth peeling along lines to ⅛"
9 - Trace of peeling
10 - None

I claim:
1. A process for applying an acrylic coating to a chrome surface by applying to a chrome surface a primer composition comprising an interpolymer of vinyl chloride, vinyl acetate and a dibasic acid, said interpolymer consisting essentially of at least 80% by weight of monomeric units derived from vinyl chloride, at least 10% by weight of monomeric units derived from vinyl acetate and at least 0.3% by weight but not more than 5% by weight of monomeric units derived from a dibasic acid or anhydride thereof, applying an acrylic polymer of film-forming molecular weight on the primer composition and heating said coated surface at a temperature of at least 235°F. for a time sufficient to cause film formation of the acrylic polymer.

2. The process of claim 1 wherein the acrylic polymer is applied as a spray.

3. The process of claim 2 wherein the primer composition is applied as a spray.

4. The process of claim 1 wherein the acrylic polymer is applied by a contact applicator.

5. The process of claim 1 wherein the primer composition is applied as a spray.

6. The process of claim 1 wherein the interpolymer consists essentially of between 83 and 88% by weight of monomeric units derived from vinyl chloride, between 10 and 15% by weight of monomeric units derived from vinyl acetate and not more than 2% by weight of monomeric units derived from a dicarboxylic acid or anhydride thereof.

7. The process of claim 6 wherein the interpolymer consists essentially of about 86% by weight of monomeric units derived from vinyl chloride, about 13% by weight of monomeric units derived from vinyl acetate and about 1% by weight of monomeric units derived from maleic acid or maleic anhydride.

8. The process of claim 6 wherein the primer composition also contains an organotin maleate stabilizer in an amount of between 3 and 8% by weight based on the weight of the interpolymer.

9. The process of claim 8 wherein said primer composition containing interpolymer and stabilizer comprises at least 90% by weight of methylethyl ketone.

10. The process of claim 8 wherein the application of heat is at a temperature of at least 275°F.

11. The process of claim 10 wherein the application of heat is at a temperature of at least 300°F.

12. The process of claim 6 wherein the application of heat is at a temperature of at least 275°F.

13. The process of claim 12 wherein the application of heat is at a temperature of at least 300°F.

14. The process of claim 1 wherein the application of heat is at a temperature of at least 275°F.

15. The process of claim 14 wherein the application of heat is at a temperature of at least 300°F.

16. Product prepared by the process of claim 1.

17. Product prepared by the process of claim 6.

18. Product prepared by the process of claim 8.

19. Product prepared by the process of claim 13.

20. Product prepared by the process of claim 11.

* * * * *